United States Patent
Finn et al.

(10) Patent No.: US 8,655,674 B2
(45) Date of Patent: Feb. 18, 2014

(54) PERSONAL SERVICE ASSISTANCE IN A VIRTUAL UNIVERSE

(75) Inventors: Peter G. Finn, Brampton (CA); Rick A. Hamilton, II, Charlottesville, VA (US); Neil A. Katz, Parkland, FL (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 692 days.

(21) Appl. No.: 12/144,877

(22) Filed: Jun. 24, 2008

(65) Prior Publication Data

US 2009/0319286 A1  Dec. 24, 2009

(51) Int. Cl.
*G06Q 10/00* (2012.01)
*G06F 17/00* (2006.01)
*G06N 5/00* (2006.01)
*G06N 5/04* (2006.01)

(52) U.S. Cl.
USPC .................. 705/1.1; 706/11; 706/45; 706/46; 706/47; 706/48; 706/61

(58) Field of Classification Search
USPC .............. 705/1.1, 26, 500; 706/11, 45–48, 61
See application file for complete search history.

(56) References Cited

U.S. PATENT DOCUMENTS

| | | | |
|---|---|---|---|
| 6,748,376 B1 * | 6/2004 | Beall et al. ............................. | 1/1 |
| 6,792,401 B1 | 9/2004 | Nigro et al. | |
| 6,985,874 B1 | 1/2006 | Ebihara et al. | |
| 7,353,016 B2 * | 4/2008 | Roundtree et al. ......... | 455/414.1 |
| 2002/0018076 A1 | 2/2002 | Gianola | |
| 2002/0103746 A1 | 8/2002 | Moffet, Jr. | |
| 2003/0004743 A1 | 1/2003 | Callegari | |
| 2003/0046410 A1 | 3/2003 | Gusler et al. | |
| 2003/0055745 A1 | 3/2003 | Kim | |
| 2003/0128205 A1 * | 7/2003 | Varghese ....................... | 345/419 |
| 2005/0125229 A1 | 6/2005 | Kurzweil | |

(Continued)

FOREIGN PATENT DOCUMENTS

| JP | 2002236834 | 8/2002 |
|---|---|---|
| JP | 2007157099 | 6/2007 |

OTHER PUBLICATIONS

Yu, U.S. Appl. No. 12/144,788, Office Action Communication, END920070129US1, May 27, 2011, 23 pages.

(Continued)

*Primary Examiner* — Jami A Plucinski
*Assistant Examiner* — Sangeeta Bahl
(74) *Attorney, Agent, or Firm* — Lisa Ulrich; Hoffman Warnick LLC (57) ABSTRACT

A method of providing personal service assistance in a virtual universe is disclosed. The method provides a customer avatar (CA) access to a personal assistance avatar or personal customer service representative (PCSR) avatar, hereinafter PCSR avatar. Through the PCSR avatar, the CA communicates a need or requests for personal service assistance from a business or organization. The communication of the received request is processed to identify an appropriate business, organization or vendor that meets the need or request. The identified business, organization or vendor is contacted for a representative from the business to accede to the request from the CA. The representative from the business is allowed to assume control of the PCSR avatar to conduct the session necessary for rendering the assistance or transaction. Upon completion of the session, control of the PCSR avatar is reverted to that prior to the session.

23 Claims, 5 Drawing Sheets

(56) References Cited

U.S. PATENT DOCUMENTS

| | | | |
|---|---|---|---|
| 2006/0122917 A1 | 6/2006 | Lokuge et al. | |
| 2006/0248461 A1 | 11/2006 | Yamada et al. | |
| 2007/0166690 A1 | 7/2007 | Johnson | |
| 2008/0086696 A1* | 4/2008 | Sri Prakash et al. | 715/757 |
| 2008/0140581 A1 | 6/2008 | Mayer | |
| 2008/0263459 A1* | 10/2008 | Altberg et al. | 715/757 |

OTHER PUBLICATIONS

Yu, U.S. Appl. No. 12/144,788, Office Action Communication, END920070129US1, Oct. 27, 2011, 28 pages.
U.S. Appl. No. 12/144,788, Office Action dated Nov. 21, 2012.
U.S. Appl. No. 12/144,788, Office Action dated Apr. 15, 2013.

* cited by examiner

PERSONAL SERVICE ASSISTANCE IN A VIRTUAL UNIVERSE

CROSS REFERENCE TO RELATED APPLICATIONS

This patent application is related in some aspects to co-pending U.S. patent application Ser. No. 12/144,788, entitled "COMPETITIVE SALES ENVIRONMENT IN A VIRTUAL WORLD," which is incorporated herein by reference.

FIELD OF THE INVENTION

This disclosure relates generally to virtual universes, and more specifically to personal customer services within a virtual universe.

BACKGROUND OF THE INVENTION

Virtual universes or virtual worlds are computer-based simulated environments intended for its users to inhabit and interact via avatars, which are personas or representations of the users of the virtual universes and generally take the form of two-dimensional or three-dimensional human or fantastical representations of a person's self. These types of virtual universes are now most common in massive multiplayer online games, such as Second Life® which is a trademark of Linden Research in the United States, other countries, or both. Other examples of virtual universes include Project Entropia Universe®, a trademark of Mindark PE AB in the US, other countries or both; There[SM].com, a service mark of Makena Technologies, Inc. in the US, other countries or both; Kaneva® Game Platform (KGP), a trademark owned by Kaneva, Inc. in the US, other countries or both.

Avatars in these types of virtual universes, which can number well over a million, have a wide range of business and social experiences. These avatars create, manipulate and buy and sell every aspect of their virtual lives. As a result, these virtual universes provide a fertile ground for exchanging items created for use by the avatars that exist in these virtual universes. An illustrative listing of some items that are created and exchanged in a virtual universe include apparel for avatars, animations for a multitude of purposes (e.g., instructional material), avatar accessories (e.g., jewelry, hairpieces, etc.), scripts for performing certain functions in the virtual universes, building components, avatar appearance features, recreation and equipment (e.g., dancing poles), automobiles, etc.

Avatars may find business transactions or shopping assuming the model of internet shopping in the virtual universe limiting or not user friendly. In many instances, consumer avatars may find it time consuming to search for an appropriate item or service that is suitable to their needs. This may apply to personal shopping or even corporate shopping. For example, an avatar making a purchase decision for printer toners may desire assistance for a more informative purchase and to save time.

SUMMARY OF THE INVENTION

A method of providing personal service assistance in a virtual universe is disclosed. The method, executable by a computer system may be embodied in a computer readable medium for deployment thereof. The method provides a CA (CA) access to a personal assistance avatar or personal customer service representative avatar, hereinafter PCSR avatar. Through the PCSR avatar, the CA communicates a need or request for personal service assistance from a business or organization. The communication of the received request is processed to identify an appropriate business or organization that meets the need or request. The identified business or organization is contacted for a representative from the business to accede to the request from the CA. The representative from the business or organization is allowed to assume control of the PCSR avatar to conduct the session necessary for rendering the assistance or transaction. Upon completion of the session, control of the PCSR avatar is reverted to that prior to the session.

A first aspect of the invention provides a method for rendering personal service assistance in a virtual universe, comprising: providing access to a personal customer service representative (PCSR) avatar, wherein the PCSR avatar interacts with a customer avatar (CA); defining a request for customer service from the CA via the PCSR avatar; determining a business based upon the request for customer service from the CA; connecting the PCSR avatar to the business; and facilitating an interaction between a representative of the business and the CA via the PCSR avatar.

A second aspect of the invention provides a system for rendering personal service assistance in a virtual universe, comprising: a personal customer service component stored in a memory and executable by a processing unit, the personal customer service component comprising: an access component configured to enable a customer avatar (CA) to access and interact with a personal customer service representative (PCSR) avatar; a definition component configured to receive a request for personal service assistance from the CA through the PCSR avatar; a determination component configured to determine a business based upon the request for personal service from the CA; and a facilitator component configured to facilitate an interaction between a representative of the business and the CA by assuming control over the PCSR avatar.

A third aspect of the invention provides a computer program product stored on a computer-readable medium, the computer program product including computer instructions, which when executed, enables a computer system to render personal service assistance in a virtual universe, the computer instructions comprising: providing access to a personal customer service representative (PCSR) avatar, wherein the PCSR avatar interacts with a customer avatar (CA); defining a request for customer service from the CA via the PCSR avatar; determining a business based upon the request for customer service from the CA; connecting the PCSR avatar to the business; and facilitating an interaction between a representative of the business and the CA via the PCSR avatar.

A fourth aspect of the invention provides a method for deploying an application in a computer system that renders personal service assistance in a virtual universe, comprising: providing a computer infrastructure operable to: provide access to a personal customer service representative (PCSR) avatar, wherein the PCSR avatar interacts with a customer avatar (CA); define a request for customer service from the CA via the PCSR avatar; determine a business based upon the request for customer service from the CA; connect the PCSR avatar to the business; and facilitate an interaction between a representative of the business and the CA via the PCSR avatar.

BRIEF DESCRIPTION OF THE DRAWINGS

Various embodiments are described in the following detailed description with accompanying drawings depicting the various aspects of the invention to provide a better appreciation of the invention, in which.

It is noted that the drawings of the invention are not to scale. The drawings are intended to depict only typical aspects of the invention, and therefore should not be considered as limiting the scope of the invention. In the drawings, like numbering represents like elements among the drawings.

DETAILED DESCRIPTION OF THE INVENTION

Embodiments of this invention are directed to a technique for facilitating exchange of items/services in a virtual universe. The exchange of items/services may be in the form of bartering, auctioning, trading, or selling through a personal customer service representative (PCSR) avatar. The features of this invention provide the capability to match buyers desiring specific items/services with businesses/vendors that are in possession of these items/services.

Figure 1:
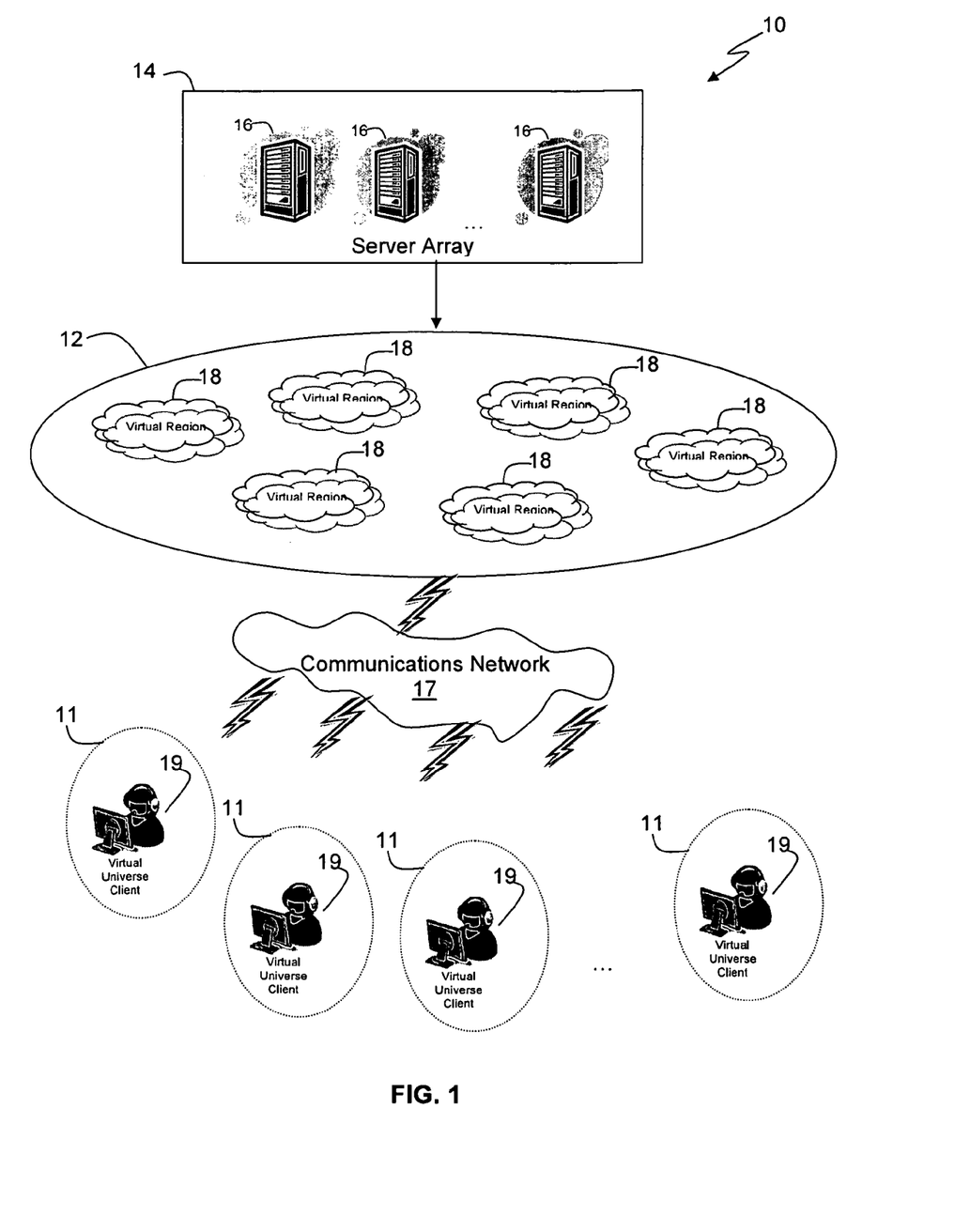
FIG. 1 is a high-level schematic diagram showing a networking environment for providing a virtual universe according to one embodiment of this invention.
Figure 5:
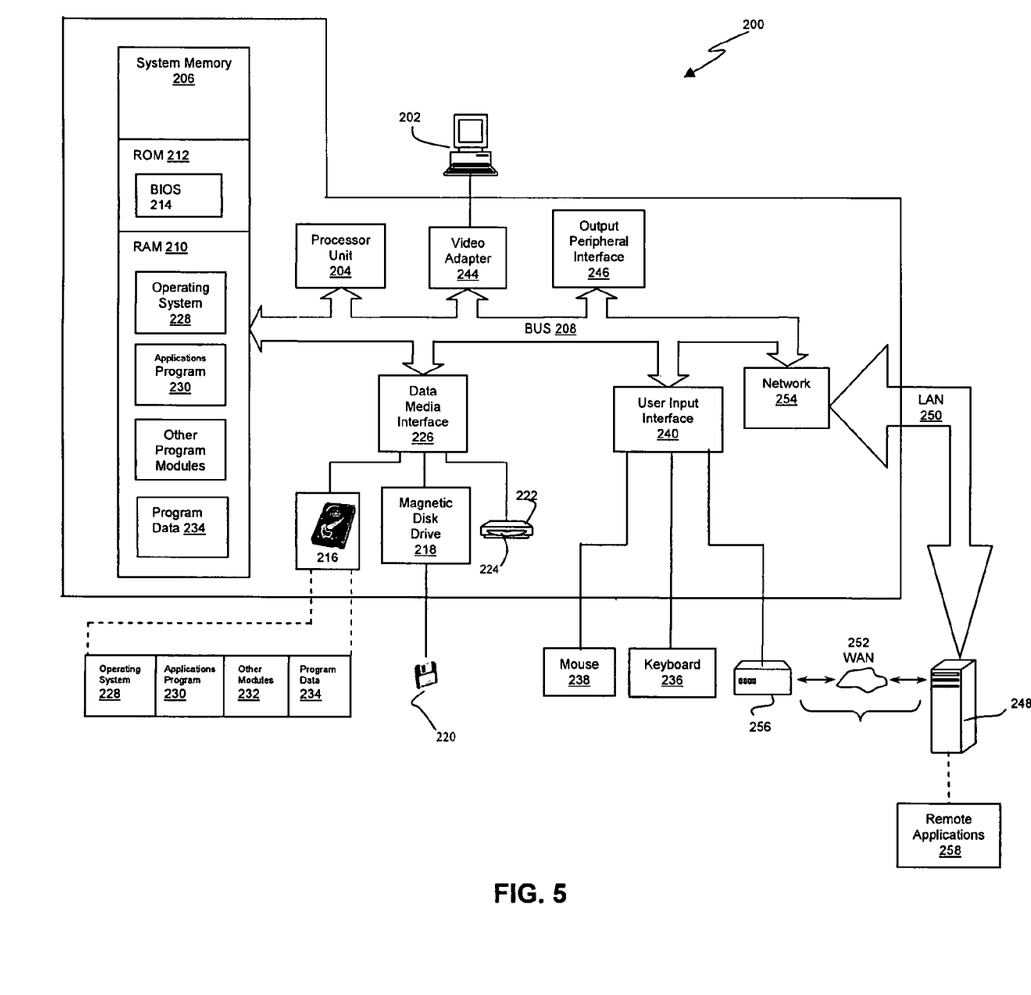
FIG. 5 shows a schematic of an exemplary computing environment in which elements of FIGS. 1-4 may operate.

FIG. 1 shows a high-level schematic diagram showing a networking environment 10 for providing a virtual universe 12 according to one embodiment of this invention in which a service for facilitating exchange of items/services between two parties through a PCSR avatar. As shown in FIG. 1, the networking environment 10 comprises a server array or grid 14 comprising a plurality of servers 16 each responsible for managing a portion of virtual real estate within the virtual universe 12. A virtual universe provided by a typical massive multiplayer online game can employ thousands of servers to manage all of the virtual real estate. The content of the virtual real estate that is managed by each of the servers 16 within the server array 14 shows up in the virtual universe 12 as a virtual region 18. The number of virtual regions 18 illustrated in FIG. 1 is only for illustration purposes and those skilled in the art will appreciate that there may be many more regions found in a typical virtual universe, or within one region in a small virtual universe. FIG. 1 also shows that users operating computers 11 interact with the virtual universe 12 through a communication network 17 via a virtual universe client 19 that resides in an exemplary computer 202 (FIG. 5). Details of such an exemplary computer 202 are discussed in the following paragraphs corresponding to FIG. 5.

Figure 2:
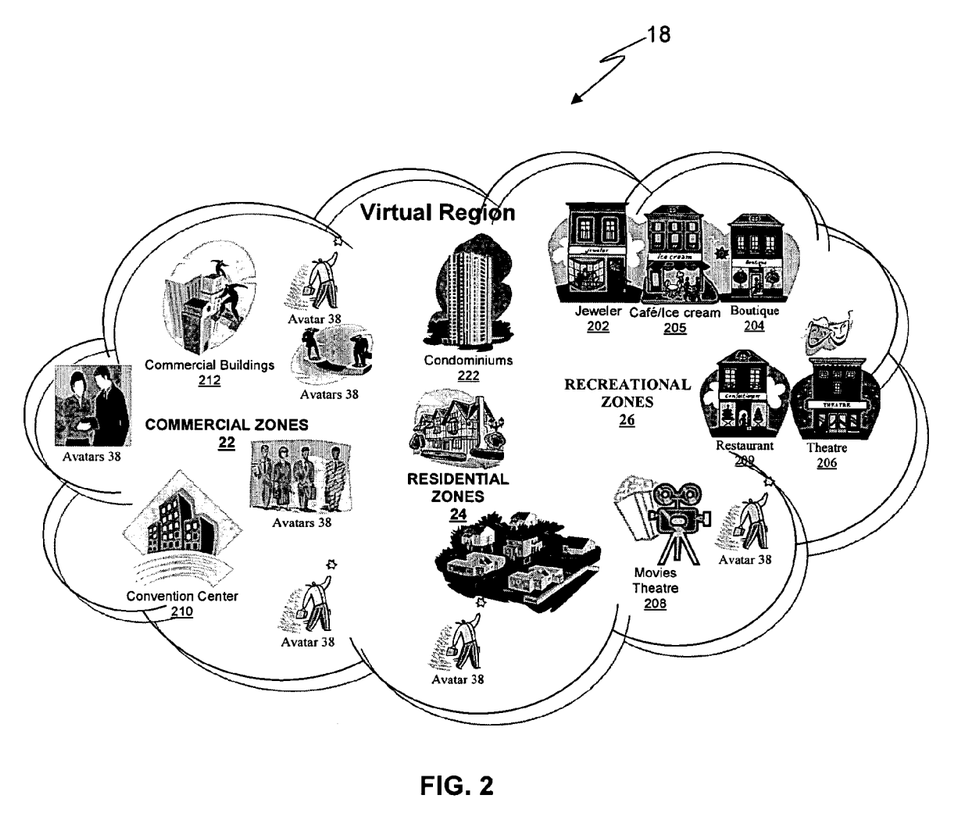
FIG. 2 is a more detailed view of a virtual region within the virtual universe shown in FIG. 1.

As illustrated in FIG. 2, each virtual region 18 within the virtual universe 12 comprises a living landscape as in the real-world. Each virtual region 18 may include, for example, but not limited to cities and towns with commercial zones 22, residential zones 24 and recreational zones 26. Each commercial zone 22 may include, for example, but is not limited to convention centers 210, commercial buildings 212 and other architectures for various commercial activities. Each residential zone 24 may include but is not limited to condominiums 222, housing estates 224 and other residential neighborhoods. Each recreational zone 26 may include facilities for example, but not limited to clubs, gyms, parks, theatres, boutiques, restaurants and malls. All of such commercial buildings, neighborhoods and facilities are created by virtual communities formed by residents of the virtual universe represented by avatars. Furthermore, the types of facilities that make up the living landscape in virtual regions 18 shown in FIG. 2 are only for illustration purposes and may include other facilities not explicitly set out herein, for example, but not limited to: welfare zones, religious community zones and public amenities zones.

One of the ways that users of the virtual universe 12 can use the virtual universe client 19 to interact with the universe is to create digital content/services or items for the virtual universe. An illustrative but non-limiting listing of items that can be created through the virtual universe client 19 includes items such as apparel for avatars, animations for a multitude of purposes (instructional material), avatar accessories (e.g., jewelry, hairpieces, clothing, etc.), services (e.g., grooming, legal, hospitality, health and well-being, culinary training, diving lessons, virtual real estate brokerage, etc.) scripts for performing certain functions in the virtual universes, building components, avatar appearance features, recreation and equipment (e.g., bicycles), automobiles, etc. Such digital content/services or items may be traded amongst individual avatars within a virtual community or between virtual communities of a virtual region(s) 18 or between virtual region(s) 18 in the virtual universe 12.

As mentioned above, embodiments of this invention are directed to facilitating the exchange of these types of services/items between avatars that reside in the virtual universe 12 and providing a mechanism to facilitate trading or transactions of the content/services or items. For example, if a CA (CA) 302 (FIG. 3) wishes to purchase an item or requires a certain service, the avatar accesses a single personal customer service representative (PCSR) avatar 312 (FIG. 3) and communicates his/her needs through the single PCSR avatar 312 to an actual customer service representative 310 (FIG. 3) of a business/organization. For example, the CA 302 may wish to purchase some athletic apparel, have a haircut and arrange for a reunion party. The CA 302 may access and communicate his/her need(s)/request(s) to the single PCSR avatar 312. The single PCSR avatar 312 may communicate the need(s)/request(s) to the respective customer service departments (not shown) of relevant retailers of athletic apparel, service providers for haircuts and events organizers/planers. More particularly, through the PCSR avatar 312, each customer service of the relevant businesses/organization (not shown) may attend to the need(s)/request(s) of the CA 302 (FIG. 3), providing immediate and direct attention in the setting of a designated store/customer service office.

In the example of the athletic apparel, the CA may be attended to by a customer service representative 310 (FIG. 3) of a particular business (e.g., Nike®, Inc., PUMA®AG Rudolf Dassler Sport, Patagonia®, Inc., Prana®, Inc. etc.) in a virtual retail store setting (not shown) to assist in the selection of the desired athletic apparel of the CA 302 through a PCSR avatar. In the example of the hair dressing service, the CA 302 may be attended to by a customer service representative of a particular hairdressing service at a virtual salon (not shown) within the virtual universe to assist in the haircut or hairstyling of the CA 302 through a PCSR avatar 312. In the example of the reunion party, a CA 302 may be attended to by a customer service representative 310 (FIG. 3) of an events management service provider (not shown) to assist in the selection of the desired theme, the menu of the reunion party of the CA 302 through a PCSR avatar 312.

Figure 3:
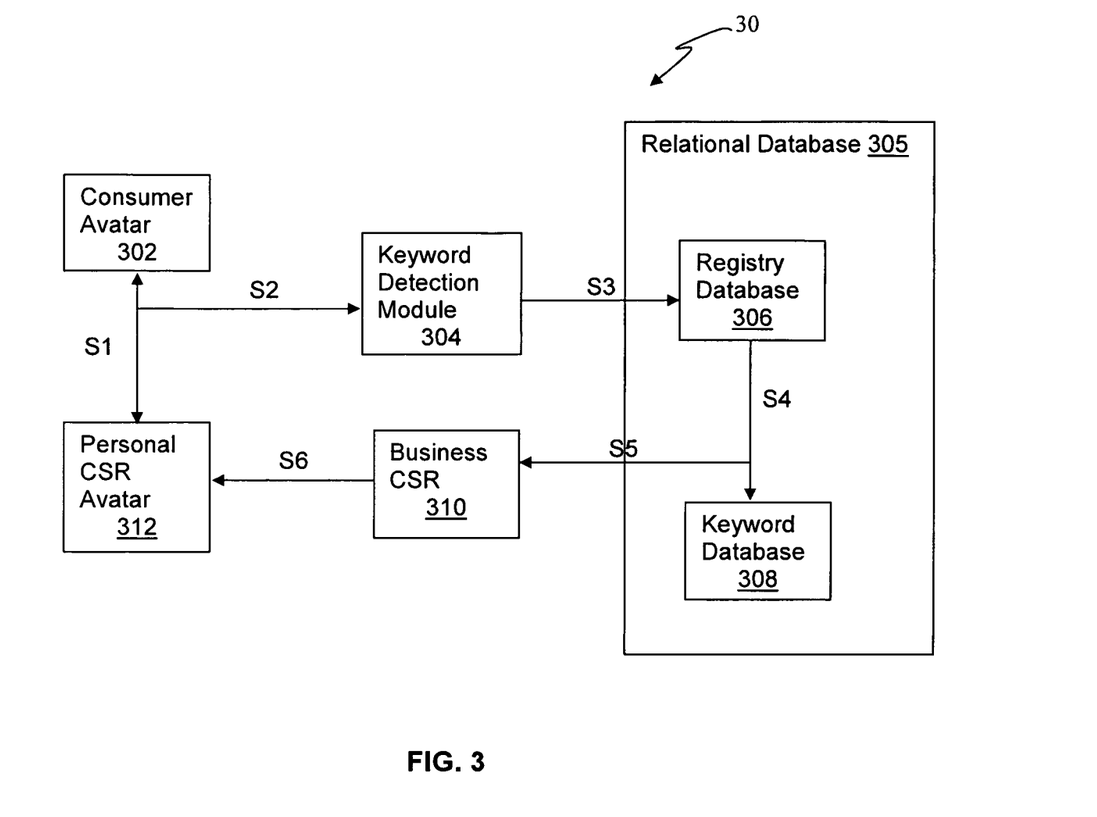
FIG. 3 is a schematic diagram of an exemplary example of a method for providing personal customer service representative (PCSR) avatar services in assisting a CA.

The customer service representative 310 of any one service provider or business entity (e.g., an athletic apparel brand, a hair salon, an events management company) may assume control of the PCSR avatar 312 at any one point in time to assist or address the need(s)/request(s) of the CA 302.

Below are additional details on the customer service representative mechanism of this invention and how it enables CAs (CA) to obtain services or items in the virtual universe 12 from a plurality of unrelated businesses.

FIG. 2 shows a more detailed view of what one virtual region 18 shown in the virtual universe 12 of FIG. 1. As an example, the virtual region 18 shown in FIG. 2 comprises a downtown commercial zone 22, residential zone 24, recreational zone 26. Commercial zone 22 may include a convention center 210 for various meetings/conventions and commercial buildings 212 for offices of various businesses. Residential zone 24 may include, for example, but is not limited to: landed housing estates 224 and condominiums 222. Recreational zone 26 may include businesses or services, for example, but not limited to: jeweler 202, boutiques 204, ice-cream cafés 205, theatre 206, movie theatres 208 and restaurants 209. Residents or avatars 38, which are personas or representations of the users of the virtual universe, commute or roam all about the virtual region 18 to conduct their personal or official business by walking, driving, flying or even by teleportation or transportation which is essentially moving through space from one point to another, more or less instantaneously. Personal or official business may include, for example, but not limited to: commuting to work in offices in commercial buildings 212 in the commercial zone 22; and attending a theatre performance in a theatre in the recreational zone 26. These examples of activities/items in the virtual region 18 shown in FIG. 2 are only illustrative of some things/activities/businesses that may be found in a virtual region 18 and those skilled in the art will recognize that these regions 18 can have many more items that can be found in a real-life universe as well as things that do not presently exist in real life.

FIG. 3 shows a logic flow 30 of an exemplary example of a method for providing personal customer service representative (PCSR) avatar 312 services in assisting a CA 302 in the virtual universe 12 shown in FIG. 1. Through virtual universe client 19 (FIG. 1), users may interact with the virtual universe 12 as CA 302. The method disclosed herein may also be applicable to any three dimensional (3-D) internet space where participating businesses conduct business transactions. The logic flow 30 includes process S1 where CA 302 accesses a PCSR avatar 312 and communicates the desired need(s)/request(s) to the PCSR avatar 312. As the communication proceeds, logic flow in process S2 parses the text of the communication to determine the need(s)/request(s) required. The method may include a database 305 where a listing of businesses/vendors of various businesses and the relevant contacts/relationships may be retrieved in process S3 or where general contact information, may be retrieved in process S4. After contact has been established, logic flow control is returned to PCSR avatar 312 from a search agent in database 305 in process S5. With customer service representative (CSR) 310 of contacted business/vendor assuming temporary control of PCSR avatar 312 in process S6, interaction and/or any transaction between CA 302 and CSR 310 may be conducted through PCSR avatar 312 until transaction is completed or terminated. Details of each of the processes S1-S6 are discussed in details in the following paragraphs.

As shown in FIG. 3, CA 302 gains access to PCSR avatar 312 in process S1 to convey any desired need(s)/request(s) using currently known or later developed communication techniques. PSCR avatar 312 may be a self-created avatar or an integrated service provided by an owner of the virtual universe 12. PCSR 312 is, by default, set under the control of an agent, for example, an artificial intelligence (AI) or a "Personal Assistant BOT", which is a web-based robot that is essentially a software application for performing automated tasks over the internet. However, the default setting can be changed in another embodiment. The PCSR avatar 312 may be accessed via a non-locale specific function, for example, but not limited to: an on-screen radial button, a mouse, a pendant in the CA inventory and any currently known of later developed remote access techniques. When the need(s)/request(s) of CA 302 is conveyed to PCSR avatar 312, the agent at control by default provides to CA 302 with a response, for example, "Please hold while I check for you" as the logic commence execution.

In process S2 shown in FIG. 3, the need(s)/request(s) communicated by CA 302 to PCSR avatar 312 are converted to text and compared with standard phrases or keywords via keyword detection module 304. The parsing of text provides an avenue to simplify determinative logic. For example, the text communicated by CA 302 may be "connect to XYZ billing" where the Personal Assistant BOT interprets such a text communication as a desire of CA 302 to be connected to the billing department of the business/vendor of XYZ. In the case where abbreviated text is used in the communication between CA 302 and PCSR avatar 312, the agent would interpret such abbreviated text in the manner as commonly applied in instant messaging. For example, abbreviated text, "BRB", is widely interpreted as "I will be right back"; similarly, "C2 XYZ" is interpreted as "connected to XYZ". Interpretation of abbreviated or cryptic text according to a standard or pre-defined phrases/keywords reduces complexity for detection of logic, particularly where different users interacting in virtual universe 12 as CA 302 may express himself/herself in a differentiated manner. For instance, one user may express his request as "access XYZ" while another may express her request as "connect me to XYZ", where both may be interpreted primarily as "C2 XYZ". With simplified determinative logic, the need(s)/request(s) of CA 302 may be processed or interpreted accordingly with reduced difficulty and complexity.

In process S3 as shown in FIG. 3, following simplification of determinative logic, a relational database (RDB) 305 is accessed for relevant businesses/vendors that match the need(s)/request(s) of CA 302. RDB 305 may include, for example, general contact information of different departments in a business/vendor, relevant contact information of each department within a business/vendor and specific contact information of each specific department/division in a business/vendor. Alternatively, relevant contact information pertaining to each specific department/division in a business/vendor may be organized in a registry database 306 and general information pertaining to businesses/vendors may be organized in a keyword database. In an exemplary embodiment shown in FIG. 3, RDB database 305 may be organized to include registry database 306 and keyword database 308. Such information may be retrievable/extractable through a search logic according to the interpreted communications determined in process S2. while keyword database 308 may contain. In the case where CA 302 communicates a request to connect to the printer division of International Business Machine (IBM) with communication "C2 IBM Printer", the RDB 305 search logic retrieves the current contact data of IBM's printer division and the agent executes the connection using currently known or later developed techniques. The search logic passes through a series of hierarchal levels 400, 402, 404, 406, 408 and 410 (FIG. 4) to retrieve the relevant contact information.

Figure 4:
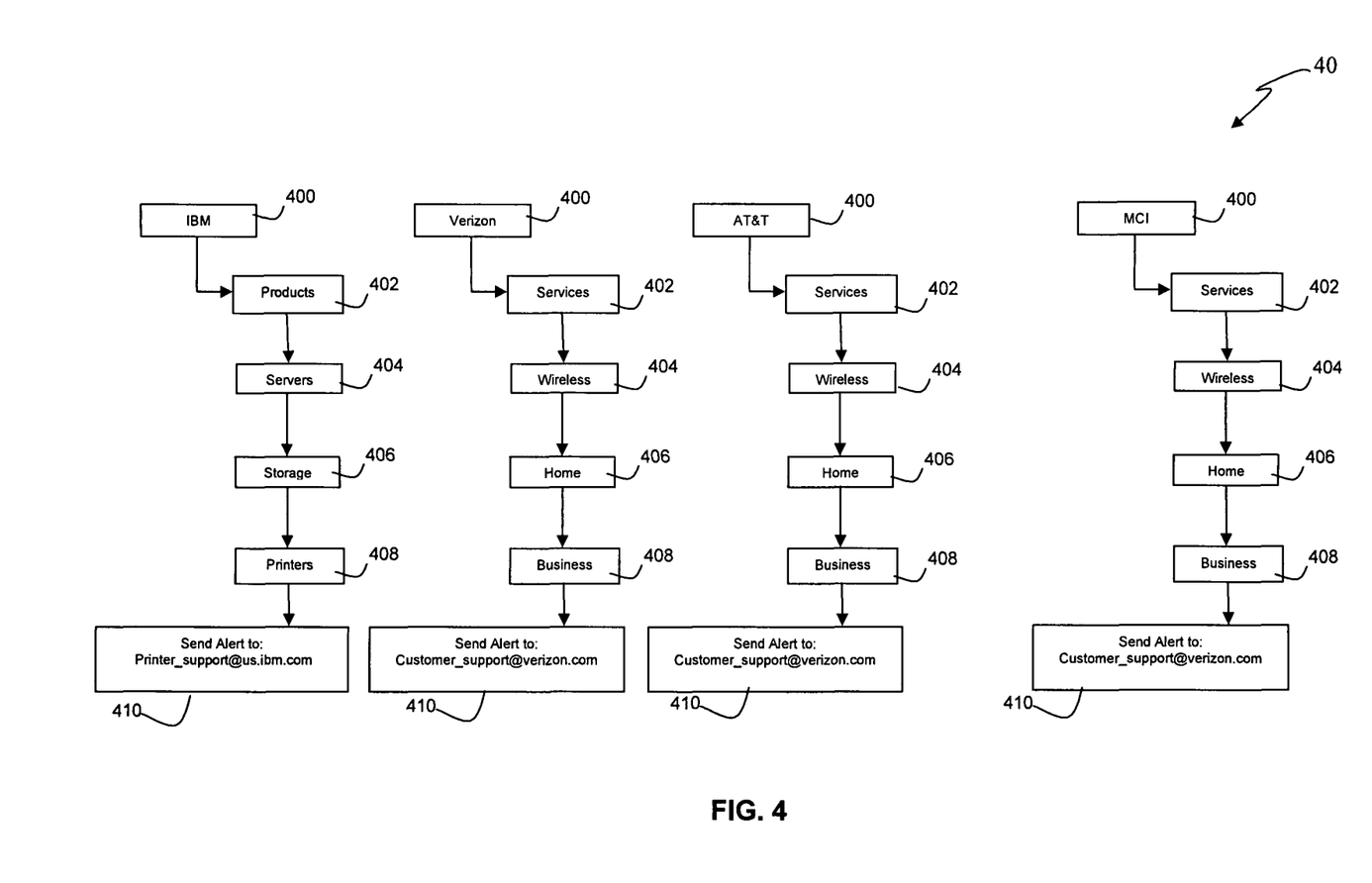
FIG. 4 is a hierarchal layout of an embodiment a registry database of the method shown in FIG. 3.

FIG. 4 illustrates a hierarchal layout 40 of a registry database 306 including a collection of different businesses/vendors 400 (e.g., IBM, XYZ, YYY, ZZZ, etc.) providing similar or related services. Each business/vendor 400 in the hierarchal layout 40 includes various hierarchal layers/levels 402, 404, 406, 408 and 410. For example, within IBM, the hierarchal levels include products 402, servers 404, storage 406, printers 408 and alert 410. However, at each hierarchal level the features/services between different business/vendor may be different. For example, comparing XYZ with IBM, at hierarchal level 402, XYZ features services while IBM features products; at hierarchal level 404, XYZ features wireless while IBM features servers; at hierarchal level 406, XYZ features home while IBM features storage; and at hierarchal level 408, XYZ features business while IBM features printers. On retrieving/extracting the relevant contact information for IBM's printer division, an alert 410 is sent to notify the retrieved/extracted contact. In the exemplary example in FIG. 4, alert 410 is conveyed via email. However, alternative techniques that are currently known or later developed may be adopted as a means of alerting the relevant contact(s) of a designated business/vendor.

In the case where the search returns no result from the RDB in registry database 306, the logic flow to keyword database 308 to execute a similar search to return a result with general information of multiple likely vendors without any set relationships as contact information obtained from registry database 306. For example, CA 302 may enter "C2 XYZ mobile wireless", but a search in the registry database 306 return no relevant contact information for XYZ mobile wireless, the PCSR avatar 312 may respond by suggesting results obtained from keyword database 306 with "No available contact information on XYZ mobile wireless. Do you want to contact XYZ wireless instead?"

General contact information from keyword database obtained in process S4 (FIG. 3) may also serve as a primary avenue in selecting a vendor where the CA 302 has only a general idea of what is desired to meet his/her needs but has not established any specific requirements/criteria as a specific brand/business/vendor. For example, where CA 302 enters "C2 wireless phone", the PCSR avatar 312 may respond by suggesting results obtained from keyword database 306 with "Do you want to contact XYZ, YYY or ZZZ?"

Once a selection is made, customer service representative (CSR) 310 of a particular business/vendor is contacted in process S5 and control is passed from registry database 306 back to PCSR avatar 312 using currently known or later developed connection techniques.

According to process S6, the CSR 310 assumes control of the PCSR avatar 312 to render the necessary assistance to address the need(s)/request(s) of the CA 302. CSR 310 may be controlled by human or another agent of artificial intelligence (AI). Through this connection a session for interaction/negotiation/transaction between remote business/vendor and the user can be conducted through CSR 310 of selected remote business/vendor and the CA 302. In a preferred embodiment, CSR 310 may take temporary control of PCSR avatar 312, where the underlying agent (i.e., personal assistant BOT or any other similar agent) may become a pass-through/sleeping agent for the duration of the session. Upon disconnection/termination of the session, the agent returns to normal logic/operational state (i.e., control is transferred from CSR 310 to the agent). In each of the embodiments, the transition of control of PCSR avatar 312 between human intervention and the agent is not apparent to the user interacting through CA 302.

Process S6 may include providing an effect of "bring the environment of a relevant business/store" to CA 302 on assuming control of the PCSR avatar 312. In one embodiment, the screen displayed to the CA 302 may be replaced with a template of the associated business providing an effect of "bring the store" to the CA 302. For example, when an IBM CSR 310 from the selected IBM printer division is connected and assumes control of the PCSR avatar 312, a predetermined IBM printer store background is loaded onto the screen to provide the CA 302 with the feel/effect of "being in the store" where the session is conducted. On termination of the session, the CA 302 is returned to the previous screen before the session. In another embodiment, CA 302 is automatically teleported to the virtual location of CSR 310 for the session and returned upon completion/termination of the session to the virtual environment before the session. In yet another embodiment, CA 302 is redirected to, or offered a browser screen to access on-line support from the desired business via a web interface, which may also include serving the business "live chat" interface to CA 302.

In another embodiment, the methodologies disclosed herein provide a business method that performs the processes of the methodologies on a subscription, advertising, and/or fee basis. A service provider can create, maintain, support, etc., a computer system that performs the processes of the invention for one or more customers. In return, the service provider can receive payment from the customer(s) under a subscription and/or fee agreement and/or the service provider can receive payment from the sale of advertising space to one or more third parties.

In still another embodiment, the methodologies disclosed herein can be used within a computer system to facilitate personal customer services within a virtual universe. In this case one or more systems for performing the processes described in the invention (e.g., logic flow 30) can be obtained and deployed to a computer infrastructure. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

FIG. 5 shows a schematic of an exemplary computing environment 500 in which elements of the networking environment shown in FIG. 1 may operate. The exemplary computing environment 500 is only one example of a suitable computing environment and is not intended to suggest any limitation as to the scope of use or functionality of the approach described herein. Neither should the computing environment 500 be interpreted as having any dependency or requirement relating to any one or combination of components illustrated in FIG. 5.

In the computing environment 500 there is a computer 502 which is operational with numerous other general purpose or special purpose computing system environments or configurations. Examples of well known computing systems, environments, and/or configurations that may be suitable for use with an exemplary computer 502 include, but are not limited to, personal computers (PC), server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary computer 502 may be described in the general context of computer-executable instructions, such as program modules, being executed by a computer. Generally, program modules include routines, programs, objects, components, logic, data structures, and so on, that performs particular tasks or implements particular abstract data types. The exemplary computer 502 may be practiced in distributed computing environments where tasks are performed by remote processing devices that are linked through a communications network. In a distributed computing environment, program modules may be located in both local and remote computer storage media including memory storage devices.

As shown in FIG. 5, the computer 502 in the computing environment 500 is shown in the form of a general-purpose computing device. The components of computer 502 may include, but are not limited to, one or more processors or processing units 504, a system memory 506, and a bus 508 that couples various system components including the system memory 506 to the processor 504.

Bus 508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 502 typically includes a variety of computer readable media. Such media may be any available media that is accessible by computer 502, and it includes both volatile and non-volatile media, removable and non-removable media.

In FIG. 5, the system memory 506 includes computer readable media in the form of volatile memory, such as random access memory (RAM) 510, and/or non-volatile memory, such as ROM 512. A BIOS 514 containing the basic routines that help to transfer information between elements within computer 502, such as during start-up, is stored in ROM 512. RAM 510 typically contains data and/or program modules that are immediately accessible to and/or presently operated on by processor 504.

Computer 502 may further include other removable/non-removable, volatile/non-volatile computer storage media. By way of example only, FIG. 5 illustrates a hard disk drive 516 for reading from and writing to a non-removable, non-volatile magnetic media (not shown and typically called a "hard drive"), a magnetic disk drive 518 for reading from and writing to a removable, non-volatile magnetic disk 520 (e.g., a "floppy disk"), and an optical disk drive 522 for reading from or writing to a removable, non-volatile optical disk 524 such as a CD-ROM, DVD-ROM or other optical media. The hard disk drive 516, magnetic disk drive 518, and optical disk drive 522 are each connected to bus 508 by one or more data media interfaces 526.

The drives and their associated computer-readable media provide nonvolatile storage of computer readable instructions, data structures, program modules, and other data for computer 502. Although the exemplary environment described herein employs a hard disk 516, a removable magnetic disk 518 and a removable optical disk 522, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on the hard disk 516, magnetic disk 520, optical disk 522, ROM 512, or RAM 510, including, by way of example, and not limitation, an operating system 528, one or more application programs 530, other program modules 532, and program data 534. Each of the operating system 528, one or more application programs 530, other program modules 532, and program data 534 or some combination thereof, may include an implementation of the networking environment 10 of FIG. 1 including the server array 14, the virtual universe client 19, according to a logic flow 30 (FIG. 3) for providing personal customer service through PCSR avatar 312.

A user may enter commands and information into computer 502 through optional input devices such as a keyboard 536 and a pointing device 538 (such as a "mouse"). Other input devices (not shown) may include a microphone, joystick, game pad, satellite dish, serial port, scanner, camera, or the like. These and other input devices are connected to the processor unit 504 through a user input interface 540 that is coupled to bus 508, but may be connected by other interface and bus structures, such as a parallel port, game port, or a universal serial bus (USB).

An optional monitor 542 or other type of display device is also connected to bus 508 via an interface, such as a video adapter 544. In addition to the monitor, personal computers typically include other peripheral output devices (not shown), such as speakers and printers, which may be connected through output peripheral interface 546.

Computer 502 may operate in a networked environment using logical connections to one or more remote computers, such as a remote server/computer 548. Remote computer 548 may include many or all of the elements and features described herein relative to computer 502.

Logical connections shown in FIG. 5 are a local area network (LAN) 550 and a general wide area network (WAN) 552. Such networking environments are commonplace in offices, enterprise-wide computer networks, intranets, and the Internet. When used in a LAN networking environment, the computer 502 is connected to LAN 550 via network interface or adapter 554. When used in a WAN networking environment, the computer typically includes a modem 556 or other means for establishing communications over the WAN 552. The modem, which may be internal or external, may be connected to the system bus 508 via the user input interface 540 or other appropriate mechanism.

In a networked environment, program modules depicted relative to the personal computer 502, or portions thereof, may be stored in a remote memory storage device. By way of example, and not limitation, FIG. 5 illustrates remote application programs 558 as residing on a memory device of remote computer 548. It will be appreciated that the network connections shown and described are exemplary and other means of establishing a communications link between the computers may be used.

An implementation of an exemplary computer 502 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable media containing computer instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for redistributing licensed items in a virtual universe. While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method for rendering personal service assistance in a virtual universe, comprising:
   providing access, using at least one computing device, to a single personal customer service representative (PCSR) avatar, wherein the single PCSR avatar interacts with a plurality of customer avatars (CAs);
   defining, using the at least one computing device, a request for customer service from one CA of the plurality of CAs via the single PCSR avatar, which is separate and distinct from the CA;
   determining, using the at least one computing device, a business based upon the request for customer service from the CA;
   connecting, using the at least one computing device, the single PCSR avatar to the business;
   facilitating, using the at least one computing device, an interaction between a representative of the business and the CA via the single PCSR avatar, wherein, in response to connecting the single PCSR avatar to the business, the representative of the business automatically takes temporary control of the single PCSR avatar, such that an underlying agent controlling the single PCSR avatar becomes a temporary pass-through agent; and
   automatically, upon termination of the interaction, transferring control of the single PCSR avatar back to the underlying agent and terminating the temporary control of the single PCSR avatar by the representative of the business, wherein the underlying agent comprises one of: an Artificial Intelligence program and a personal assistance BOT.

2. The method according to claim 1, wherein the defining includes establishing, using the at least one computing device, a simplified determinative logic for interpreting input in communication from the CA with PCSR avatar.

3. The method according to claim 2, wherein the determining includes extracting, using the at least one computing device, relevant information from a database based on input received from the CA.

4. The method according to claim 3, wherein the database comprises one selected from a group consisting of: a relational database, a registry database, a keyword database and a combination thereof, wherein each of the relational database, registry database and the keyword database holds a collection of relevant information on a plurality of businesses.

5. The method according to claim 4, wherein the relevant information in the registry database includes one selected from a group consisting of: contact, relationships and mechanism of each business.

6. The method according to claim 5, wherein the determining extracts, using the at least one computing device, relevant information from the keyword database in the case where no relevant information is extracted from the registry database.

7. The method according to claim 1, wherein the facilitating further includes temporarily presenting, using the at least one computing device, a current CA screen altered to show a template of associated businesses.

8. The method according to claim 1, wherein the facilitating further includes teleporting, using the at least one computing device, the CA to a virtual location of the representative of the business.

9. The method according to claim 1, wherein the access is a non-locale specific function selected from a group consisting of: a radial button on a screen, a mouse click and a pendent in an inventory of the CA.

10. A system for rendering personal service assistance in a virtual universe, comprising:
    a personal customer service component stored in a memory and executable by a processing unit, the personal customer service component comprising:
       an access component configured to enable a plurality of customer avatars (CAs) to access and interact with a single personal customer service representative (PCSR) avatar;
       a definition component configured to receive a request for personal service assistance from one CA of the plurality of CAs through the single PCSR avatar, which is separate and distinct from the CA;
       a determination component configured to determine a business based upon the request for personal service from the CA; and
       a facilitator component configured to connect the single PCSR avatar to the business and to facilitate an interaction between a representative of the business and the CA, wherein, in response to connecting the single PCSR avatar to the business, the representative of the business automatically takes temporary control of the single PCSR avatar, such that an underlying agent controlling the single PCSR avatar becomes a temporary pass-through agent and, automatically, upon termination of the interaction, retains control of the single PCSR avatar, such that the temporary control of the single PCSR avatar by the representative of the business is terminated, wherein the underlying agent comprises one of: an Artificial Intelligence program and a personal assistance BOT.

11. The system according to claim 10, wherein the definition component establishes a simplified determinative logic based on standard keywords and phrases to facilitate one of a group consisting of: parsing, comparison and matching with data from a database.

12. The system according to claim 11, wherein the request includes data converted into text.

13. The system according to claim 10, wherein the determination component determines a contact of the business based on input text data received from the CA by extracting relevant information from a relational database.

14. The system according to claim 13, wherein the determining component provides a plurality of possible businesses that meet the request for personal service assistance in the case where no contact is determined.

15. The system according to claim 10, wherein the facilitator component includes temporarily presenting a current CA screen altered to show a template of associated businesses.

16. The system according to claim 10, wherein the facilitator component further includes teleporting the CA to a virtual location of the representative of the business.

17. A computer program product stored on a non-transitory computer-readable medium, the computer program product including computer instructions, which when executed, enables a computer system to render personal service assistance in a virtual universe, the computer instructions comprising:
   providing access to a single personal customer service representative (PCSR) avatar, wherein the single PCSR avatar interacts with a plurality of customer avatars (CAs);
   defining a request for customer service from one CA of the plurality of CAs via the single PCSR avatar, which is separate and distinct from the CA;
   determining a business based upon the request for customer service from the CA;
   connecting the single PCSR avatar to the business;
   facilitating an interaction between a representative of the business and the CA via the single PCSR avatar, wherein, in response to connecting the single PCSR avatar to the business, the representative of the business automatically takes temporary control of the single PCSR avatar, such that an underlying agent controlling the single PCSR avatar becomes a temporary pass-through agent; and
   automatically, upon termination of the interaction, transferring control of the single PCSR avatar back to the underlying agent and terminating the temporary control of the single PCSR avatar by the representative of the business, wherein the underlying agent comprises one of: an Artificial Intelligence program and a personal assistance BOT.

18. The computer program product according to claim 17, wherein the defining comprises parsing any input from the CA to establish a simplified determinative logic with standard keywords and phrases.

19. The computer program product according to claim 18, wherein the input from the CA is converted to text to facilitate parsing thereof.

20. The computer program product according to claim 17, wherein the determining comprises extracting relevant information from a database based on input from the CA.

21. The computer program product according to claim 20, wherein the database is one selected from a group consisting of: a relational database, a registry database, a keyword database and a combination thereof.

22. The computer program product according to claim 21, wherein the database holds one selected from a group consisting of: a collection of current contacts, relations and mechanism for a plurality of businesses, a collection of businesses associated with various services and a combination thereof.

23. A method for deploying an application in a computer system that renders personal service assistance in a virtual universe, comprising:
   providing a computer infrastructure operable to:
      provide access to a single personal customer service representative (PCSR) avatar, wherein the single PCSR avatar interacts with a plurality of customer avatars (CAs);
      define a request for customer service from one CA of the plurality of CAs via the single PCSR avatar, which is separate and distinct from the CA;
      determine a business based upon the request for customer service from the CA;
      connect the single PCSR avatar to the business;
      facilitate an interaction between a representative of the business and the CA via the single PCSR avatar, wherein, in response to connecting the single PCSR avatar to the business, the representative of the business automatically takes temporary control of the single PCSR avatar, such that an underlying agent controlling the single PCSR avatar becomes a temporary pass-through agent; and
      automatically, upon termination of the interaction, transfer control of the single PCSR avatar back to the underlying agent and terminate the temporary control of the single PCSR avatar by the representative of the business, wherein the underlying agent comprises one of: an Artificial Intelligence program and a personal assistance BOT.

* * * * *